US012638815B2

(12) United States Patent
Walker et al.

(10) Patent No.: US 12,638,815 B2
(45) Date of Patent: May 26, 2026

(54) SYSTEMS AND METHODS FOR INTELLIGENT MONITORING AND REGULATION OF A CONTROLLED CULTIVATION ENVIRONMENT

(71) Applicant: Druid Agriculture Inc., Charlotte, NC (US)

(72) Inventors: Julian Walker, Charlotte, NC (US); Desmond D. Irby, Charlotte, NC (US)

(73) Assignee: Druid Agriculture Inc, Charlotte, NC (US)

( * ) Notice: Subject to any disclaimer, the term of this patent is extended or adjusted under 35 U.S.C. 154(b) by 399 days.

(21) Appl. No.: 18/375,956

(22) Filed: Oct. 2, 2023

(65) Prior Publication Data

US 2024/0111257 A1     Apr. 4, 2024

Related U.S. Application Data

(60) Provisional application No. 63/412,476, filed on Oct. 2, 2022.

(51) Int. Cl.
| | |
|---|---|
| *G05B 13/02* | (2006.01) |
| *G06Q 10/0631* | (2023.01) |
| *G06Q 50/02* | (2012.01) |
| *A01G 7/00* | (2006.01) |

(52) U.S. Cl.
CPC ... *G05B 13/0265* (2013.01); *G06Q 10/06316* (2013.01); *G06Q 50/02* (2013.01); *A01G 7/00* (2013.01)

(58) Field of Classification Search
CPC ......... G05B 13/0265; G06Q 10/06316; G06Q 50/02; A01G 7/00; A01G 7/06
See application file for complete search history.

(56) References Cited

U.S. PATENT DOCUMENTS

| | | | | |
|---|---|---|---|---|
| 2017/0332544 A1* | 11/2017 | Conrad | ................. | G06N 20/00 |
| 2019/0090432 A1* | 3/2019 | Duquette | ............... | G06Q 10/06 |
| 2020/0118222 A1* | 4/2020 | Bidram | ........... | G05B 19/41865 |
| 2021/0342713 A1* | 11/2021 | D'Elia | ................. | A01M 1/026 |
| 2021/0378161 A1* | 12/2021 | Kerr | ....................... | G06Q 50/02 |

* cited by examiner

*Primary Examiner* — Redhwan K Mawari
(74) *Attorney, Agent, or Firm* — AI Patent Law / ALCE PLLC

(57) ABSTRACT

A system and method for automatic regulation of a controlled agricultural environment includes collecting sensor data from one or more sensors associated with the controlled agricultural environment, generating crop intelligence based on the collected sensor data, identifying one or more crop anomalies in the controlled agricultural environment based on the collected sensor data, and controlling one or more environment-regulating devices to regulate the controlled agricultural environment based on the collected sensor data, the generated crop intelligence, the one or more identified crop anomalies, and/or a user input or user response to a notification.

18 Claims, 5 Drawing Sheets

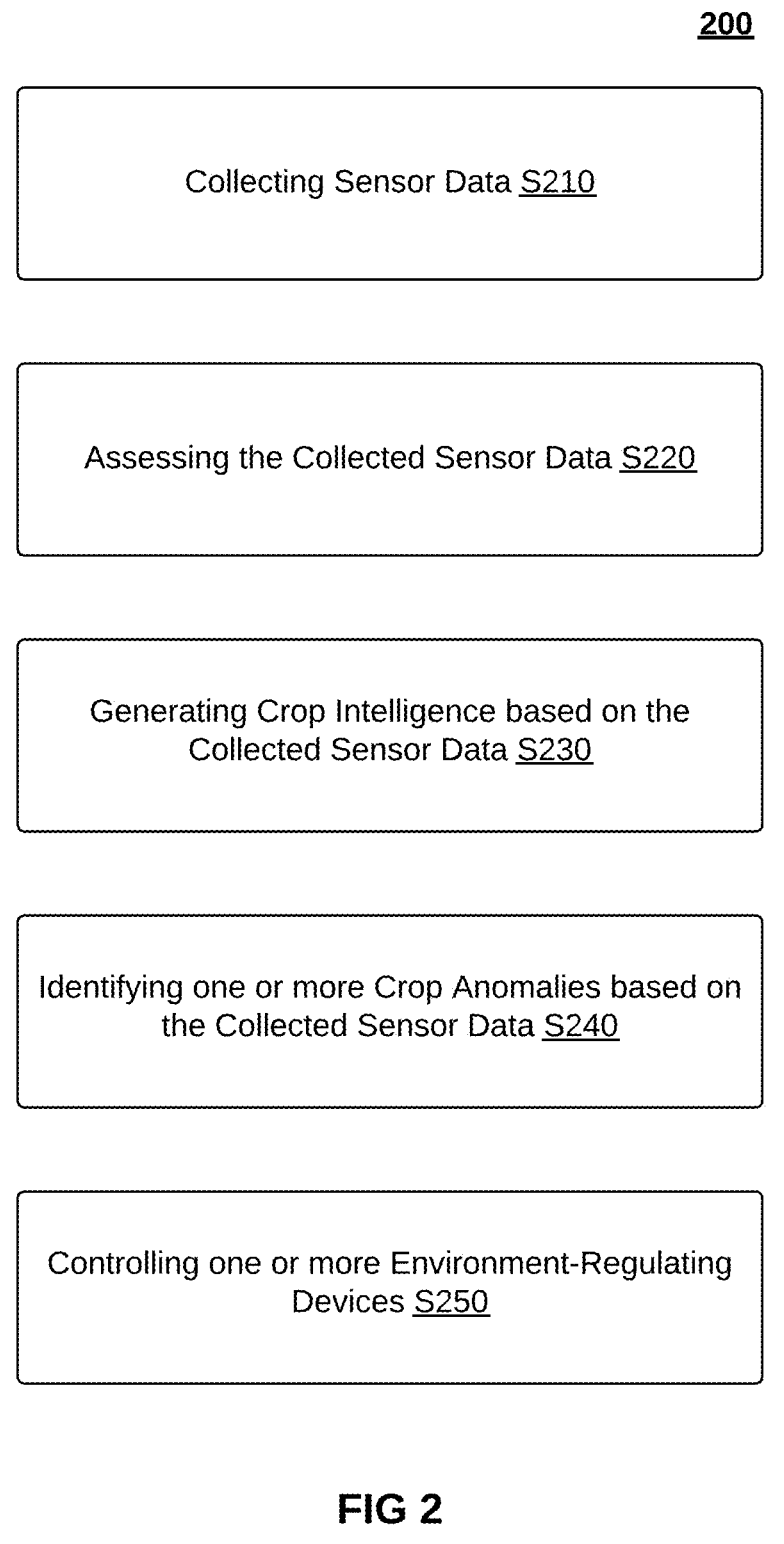

200

Collecting Sensor Data S210

Assessing the Collected Sensor Data S220

Generating Crop Intelligence based on the Collected Sensor Data S230

Identifying one or more Crop Anomalies based on the Collected Sensor Data S240

Controlling one or more Environment-Regulating Devices S250

FIG 2

SYSTEMS AND METHODS FOR INTELLIGENT MONITORING AND REGULATION OF A CONTROLLED CULTIVATION ENVIRONMENT

CROSS-REFERENCE TO RELATED APPLICATIONS

This application claims the benefit of U.S. Provisional Patent Application No. 63/412,476, filed 2 Oct. 2022, which is incorporated in its entirety by reference.

TECHNICAL FIELD

The inventions herein relate generally to the automated agricultural management fields, and more specifically to a new and useful system and method for intelligent monitoring and regulation of controlled cultivation environments in the automated agricultural management field.

BACKGROUND

Modern farms implement a variety of methods to facilitate the growth and cultivation of crops. These methods may typically include, and require, manual observations of physical properties of the crops and/or the cultivation environment in which the crops are situated. Additionally, individual manual control of the physical properties and conditions of the cultivation environment is commonly employed. However, collecting information and controlling the cultivation environment through such manual means is increasingly burdensome to individual farmers as crop quantities rise and farm sizes increase. Additionally, manual observation and control requires frequent or continuous on-site presence, which has become increasingly untenable in the modern climate.

Therefore, there is a need in the agricultural management field to create improved systems and methods for implementing intelligent monitoring and regulation of controlled cultivation environments. The embodiments of the present application described herein provide technical solutions that address, at least, the needs described above, as well as the deficiencies of the state of the art.

BRIEF SUMMARY OF THE INVENTION(S)

In one embodiment, a method for automatically regulating a controlled agricultural environment includes sourcing, from one or more sensors arranged in a controlled agricultural environment, one or more sensor values associated with one or more environmental conditions of the controlled agricultural environment; computing, by one or more computers, one or more sensor metrics based on the one or more sourced sensor values; generating, by the one or more computers, crop intelligence data based on the one or more sensor metrics, wherein generating the crop intelligence data includes: (i) identifying a target crop based on the sourced sensor values, and (ii) comparing the one or more sensor metrics to a target crop benchmark based on the identified target crop; automatically constructing, by the one or more computers, an interactive crop intelligence notification based on the generated crop intelligence data; transmitting the interactive crop intelligence notification to a subscriber, wherein the interactive crop intelligence notification includes: (i) one or more elements of crop intelligence-communicating content, wherein each element of crop intelligence-communicating content includes one or more characteristics of the generated crop intelligence data, and (ii) at least one selectable interface object that, when selected by the subscriber, initiates an automatic environment-regulating workflow that automatically controls one or more environment-regulating devices arranged within the controlled agricultural environment; and automatically controlling the one or more environment-regulating devices based on identifying a subscriber input associated with the at least one selectable interface object.

In one embodiment, the method includes collecting one or more environment images from one or more image sensors; and initiating a sensor data assessment workflow that, when executed, extracts one or more image segments from the one or more environment images; wherein automatically constructing the interactive crop intelligence notification includes installing at least one of the one or more image segments as one of the one or more elements of crop intelligence-communicating content.

In one embodiment, the method includes collecting one or more environment images from one or more image sensors; generating environment image metadata content based on the one or more environment images; and automatically constructing one or more pieces of composite environment data based on the environment image metadata content and the one or more environment images; wherein the interactive crop intelligence notification includes the one or more pieces of composite environment data.

In one embodiment, the method includes generating, by the one or more computers, sensor metadata content based on the one or more sourced sensor values, wherein the sensor metadata content includes one or more distinct sensor type labels, each distinct sensor type label corresponding to a sensor type of one of the one or more sensors; wherein at least one of the one or more sensor metrics is computed based on the one or more distinct sensor type labels; and wherein the one or more elements of crop intelligence-communicating content includes at least one of the one or more distinct sensor type labels.

In one embodiment, generating the crop intelligence data includes: identifying, based on comparing the one or more sensor metrics to the target crop benchmark, at least one of a favorable environmental condition of the controlled agricultural environment or an unfavorable environmental condition of the controlled agricultural environment; wherein the one or more elements of crop intelligence-communicating content include content based on the identified at least one of the favorable environmental condition or the unfavorable environmental condition.

In one embodiment, generating the crop intelligence data includes: identifying, based on comparing the one or more sensor metrics to the target crop benchmark, at least one unfavorable environmental condition of the controlled agricultural environment; and identifying, based on the at least one unfavorable environmental condition, one or more remediation actions to remediate the at least one unfavorable environmental condition; wherein the one or more elements of crop intelligence-communicating content include text-based content that includes one or more text strings that textually communicate the one or more remediation actions.

In one embodiment, automatically controlling the one or more environment-regulating devices includes controlling the one or more environment-regulating devices based on the one or more remediation actions.

In one embodiment, the method includes identifying, by the one or more computers, one or more crop anomalies associated with one or more adverse effects in the controlled agricultural environment based on at least one of: (a) one or more environment images collected from one or more image sensors, (b) the one or more sourced sensor values, or (c) the one or more sensor metrics; and transmitting a crop anomaly alert communication to the subscriber, wherein the crop anomaly alert communication includes text-based anomaly-descriptive content that includes one or more text strings that textually communicate one or more characteristics of the one or more crop anomalies.

In one embodiment, identifying the one or more crop anomalies includes: constructing an anomaly identification vector based on the one or more environment images; implementing an anomaly identification machine learning model that: (a) receives model input comprising the anomaly identification vector, and (b) predicts a corresponding anomaly classification for each of the one or more crop anomalies; and attributing a textual anomaly classification label to each of the one or more crop anomalies based on the corresponding anomaly classification of each of the one or more crop anomalies; wherein the text-based anomaly-descriptive content includes at least one of the textual anomaly classification labels.

In one embodiment, identifying the one or more crop anomalies includes: constructing an anomaly identification vector based on the one or more sensor values; implementing an anomaly identification machine learning model that: (a) receives model input comprising the anomaly identification vector, and (b) predicts a corresponding anomaly classification for each of the one or more crop anomalies; and attributing a textual anomaly classification label to each of the one or more crop anomalies based on the corresponding anomaly classification of each of the one or more crop anomalies; wherein the text-based anomaly-descriptive content includes at least one of the textual anomaly classification labels.

In one embodiment, identifying the one or more crop anomalies includes: identifying a corresponding anomaly category for each of the one or more crop anomalies; and computing an anomaly severity level associated with each of the one or more crop anomalies based on the corresponding anomaly category of each of the one or more crop anomalies; wherein the crop anomaly alert communication includes an anomaly severity label corresponding to the associated anomaly severity level for each of the one or more crop anomalies.

In one embodiment, the method includes initiating a sensor data assessment workflow that, when executed, validates the one or more sensor values sourced from the one or more sensors based on one or more sensor data validation indicia; wherein the one or more elements of crop intelligence-communicating content include the one or more validated sensor values.

In one embodiment, sourcing the one or more sensor values includes sourcing the one or more sensor values from one or more primary sensor suites and one or more supplementary sensor suites distinct from the one or more primary sensor suites.

In one embodiment, the method includes collecting one or more environment images from one or more cameras of the one or more primary sensor suites; wherein the interactive crop intelligence notification includes the one or more environment images.

In one embodiment, a method for automatically counteracting an anomalous crop condition in a controlled cultivation environment includes identifying an anomalous crop condition based on sensor data associated with one or more target crops arranged in a controlled cultivation environment; initiating an anomaly remediation workflow, wherein the anomaly remediation workflow includes: (a) electronically transmitting a response-enabled notification to a user, wherein the response-enabled notification includes a request for user response to the response-enabled notification to confirm a continued execution of the anomaly remediation workflow, (b) based on identifying the user response, generating a control instruction set based on the identified anomalous crop condition, wherein the control instruction set includes one or more instructions for controlling one or more remediation devices, and (c) transmitting one or more control signals to the one or more remediation devices based on the control instruction set; wherein the one or more remediation devices are activated based on transmitting the one or more control signals.

In one embodiment, the method includes identifying a location of the anomalous crop condition within the controlled cultivation environment; wherein generating the control instruction set includes identifying the one or more remediation devices as one or more local remediation devices based on the location of the anomalous crop condition and locations of the one or more local remediation devices; wherein transmitting the one or more control signals includes transmitting the one or more control signals to the one or more local remediation devices.

In one embodiment, the sensor data comprises one or more images sourced from an image-based sensor arranged to capture images in the controlled cultivation environment; identifying the anomalous crop condition includes identifying the anomalous crop condition based on at least one of the one or more images; and electronically transmitting the response-enabled notification includes transmitting the at least one of the one or more images, wherein the response-enabled notification includes the at least one of the one or more images.

In one embodiment, a method for regulating a controlled agricultural environment includes collecting, via one or more computers, sensor data from one or more sensors wherein each of the one or more sensors has a sensing region at least partially within a controlled agricultural environment; identifying, based on comparing one or more pieces of the sensor data to a crop benchmark, at least one unfavorable environmental condition of the controlled agricultural environment; constructing, via the one or more computers, a set of one or more automated environment-regulating instructions based on identifying the at least one unfavorable environmental condition; and electronically transmitting the set of one or more automated environment-regulating instructions to one or more corresponding environment-regulating devices, wherein each of the one or more corresponding environment-regulating devices is activated based on receiving at least one automated environment-regulating instruction of the set of one or more automated environment-regulating instructions.

In one embodiment, the method includes identifying, via the one or more computers, a localized subset of environment-regulating devices based on: (a) a location of the at least one unfavorable environmental condition, and (b) a device location of each environment-regulating device of the localized subset of environment-regulating devices; and identifying each of the one or more corresponding environment-regulating devices by selecting each of the one or more corresponding environment-regulating devices from the localized subset of environment-regulating devices.

In one embodiment, the method includes automatically constructing, via the one or more computers, an interactive alert notification based on identifying the at least one unfavorable environmental condition; and transmitting the interactive alert notification to a subscriber, wherein the interactive alert notification includes a request for subscriber input for confirming one or more regulating actions based on the at least one unfavorable environmental condition; wherein electronically transmitting the set of one or more automated environment-regulating instructions is based on receiving a subscriber response to the request for subscriber input.

BRIEF DESCRIPTION OF THE FIGURES

FIG. 2 illustrates an example method 200 in accordance with one or more embodiments of the present application;

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Figure 1:
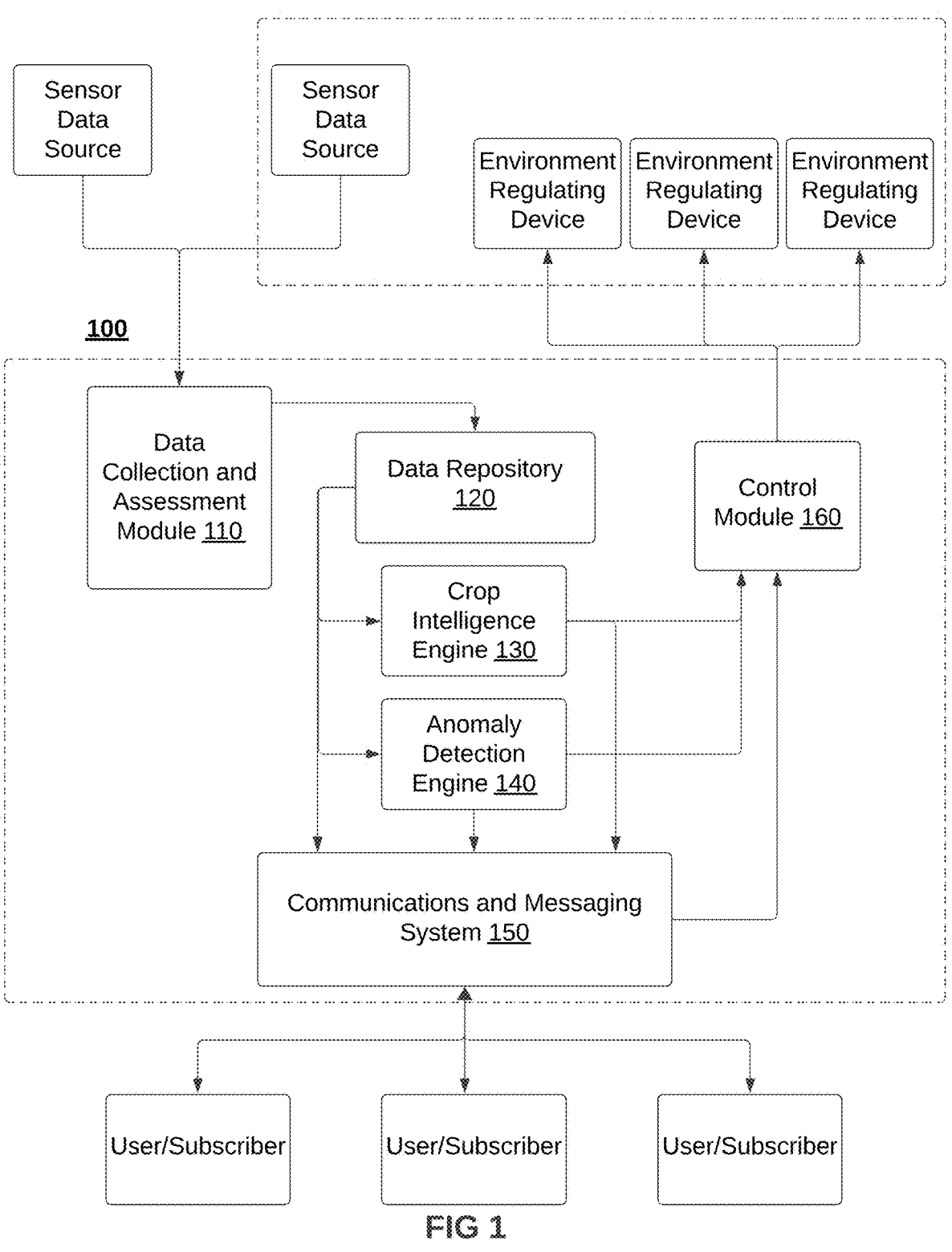
FIG. 1 illustrates a schematic representation of a system 100 in accordance with one or more embodiments of the present application.

1. System for Intelligent Monitoring and Regulation of a Controlled Cultivation Environment As shown in FIG. 1, a system 100 for intelligent monitoring and regulation of a controlled cultivation environment may include a data collection and assessment module 110, a data repository 120, a crop intelligence engine 130, an anomaly detection engine 140, a communications and messaging system 150, and a control module 160.

1.1 Data Collection and Assessment Module

The data collection and assessment module no may preferably function to collect and/or assess data from one or more sources of sensor data. In some preferred embodiments, data collection and assessment module 110 may function to receive or collect sensor data from one or more sensors and/or one or more sensor suites that may be located within, and/or arranged to sense or detect physical conditions or properties associated with, a controlled cultivation environment. A controlled cultivation environment, as generally referred to herein, may relate to a controlled environment for cultivating or growing one or more agricultural crops. Additionally, or alternatively, in some embodiments, data collection and assessment module 110 may receive stored sensor data from one or more sources of stored sensor data that may include one or more local servers or other local data storage, one or more remote servers or other remote data storage, cloud storage, one or more user devices, and/or the like.

Additionally, or alternatively, in some preferred embodiments, data collection and assessment module 110 may function to assess collected sensor data. In such embodiments, data collection and assessment module 110 may function to process collected sensor data by routing and/or storing the collected sensor data, by validating the collected sensor data, by computing one or more sensor data metrics based on the collected sensor data, by generating metadata based on the collected sensor data, and/or by performing any other suitable assessment actions using the collected sensor data. In such embodiments, data processed and/or generated by data collection and assessment module 120 may be referred to as assessed sensor data.

1.2 Data Repository

In some embodiments, system 100 may include data repository 120. In such embodiments, data repository 120 may preferably function to receive and/or store collected sensor data, assessed sensor data, and/or any data generated, collected, and/or processed by system 100. In one or more embodiments, data repository 120 may be in operable communication with one or more components of system 100, and data repository 120 may accordingly be queried by one or more components, users, and/or subscribers of system 100 to provide access to data stored in data repository 120. In some embodiments, system 100 may include a plurality of data repositories 120. Additionally, or alternatively, in some embodiments, data system 100 may be in operable communication with one or more external data repositories 120 (e.g., remote servers, cloud storage, external storage, and/or the like).

1.3 Crop Intelligence Engine

The crop intelligence engine 130 may preferably function to generate crop intelligence data based on collected sensor data and/or assessed sensor data. Crop intelligence data, as referred to herein, may include or relate to intelligence data computed or generated based on an analysis of the assessed sensor data (as described in 2.3). In some preferred embodiments, crop intelligence engine 130 may be in operable communication with data repository 120 to receive collected sensor data and/or assessed sensor data.

1.4 Anomaly Detection Engine

The anomaly detection engine 140 may preferably function to detect one or more crop anomalies in the controlled cultivation environment based on one or more inputs of collected sensor data, assessed sensor data, and/or crop intelligence data. In various embodiments, anomaly detection engine 140 may be in operable communication with data repository 120 and/or crop intelligence engine 130 to receive input data. In turn, in various embodiments, the anomaly detection engine may output one or more identified anomalies based on one or more computed anomaly classifications, anomaly predictions, and/or the like.

In various embodiments, anomaly detection engine 140 and/or crop intelligence engine 130 may implement one or more machine learning algorithms and/or one or more ensembles of trained machine learning models. In such embodiments, semantic extraction module 125 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic inter-action detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clus-tering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), LLaMA, LLaMA 2 (and subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a con-volution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggrega-tion, AdaBoost, stacked generalization, gradient boosting machine method, random forest method, etc.), and any suitable form of machine learning algorithm. Each process-ing portion of the system 100 can additionally or alterna-tively leverage: a probabilistic module, heuristic module, deterministic module, or any other suitable module lever-aging any other suitable computation method, machine learning method or combination thereof. However, any suitable machine learning approach can otherwise be incor-porated in the system 100. Further, any suitable model (e.g., machine learning, non-machine learning, etc.) may be implemented in the various systems and/or methods described herein.

1.5 Communications and Messaging System

The communications and messaging system 150 may preferably function to initiate and manage communications between system 100 and one or more users or subscribers. In some embodiments, communications and messaging sys-tem 150 may implement a user interface (e.g., a graphical user interface, a web-based interface, a dashboard, and/or the like). In one or more embodiments, communications and messaging system 150 may transmit one or more messages, alerts, notifications, and/or the like to the one or more user or subscribers via email, SMS, the user interface, and/or any other suitable communications interface or means. In one or more embodiments, communications and messaging system 150 may receive queries, responses, and/or other input from one or more users or subscribers via email, SMS, the user interface, and/or any other suitable communications inter-face or means. In some such embodiments, communications and messaging system 150 may function to route input from one or more users or subscribers to one or more components of system 100.

1.6 Control Module

The control module 160 may preferably function to automatically control one or more environment-regulating devices (as described in 2.5). In various embodiments, the one or more environment-regulating devices may function and/or be arranged to adjust, manage, or otherwise affect one or more physical properties of the controlled cultivation environment, and/or to convey or dispense one or more agricultural substances, materials, or solutions (e.g., agro-chemicals, water, and/or the like). In some embodiments, control module 160 may function to generate and/or output one or more control signals to the one or more environment-regulating devices based on user input or responses received via communications and messaging system 150. Additional-ly, or alternatively, in some embodiments, control module 160 may function to generate and/or output one or more control signals to the one or more environment-regulating devices based on one or more command signals or command instructions received as input from crop intelligence engine 130, anomaly detection engine 140, and/or communications and messaging system 150.

2. Method for Intelligent Monitoring and Regulation of a Controlled Cultivation Environment As shown in FIG. 2, a method 200 for intelligent moni-toring and regulation of a controlled cultivation environment includes collecting sensor data S210, assessing the collected sensor data S220, generating crop intelligence based on the collected sensor data S230, identifying one or more crop anomalies based on the collected sensor data S240, and controlling one or more environment-regulating devices S250.

2.1 Collecting Sensor Data

S210, which includes collecting or sourcing sensor data, may function to identify and/or collect sensor data from one or more sensors, detectors, and/or other suitable sources or corpora of sensor data. In various embodiments, the one or more sensors or detectors may be arranged to accumulate and/or provide sensor data relating to one or more environ-mental conditions or environmental properties of a con-trolled cultivation environment. A controlled cultivation environment, as generally referred to herein, may relate to a controlled or regulated environment for cultivating or grow-ing one or more agricultural or horticultural crops. In various embodiments, the one or more environmental conditions or environmental properties may include, but are not limited to, humidity, temperature, pH, light, pressure, carbon dioxide, moisture, air or wind speed, environment images, environ-ment audio, and/or any other suitable condition or property to be measured or monitored in a controlled cultivation environment.

In some preferred embodiments, S210 may function to collect sensor data from one or more optical- or image-based sensors or instruments, such that the sensor data may include (but is not limited to) visual or image data. In one or more embodiments, S210 may additionally function to source, store, and/or stream sensor data from and/or to one or more sources of data or corpora of data that may be stored in local or remote services or platforms (e.g., local or remote servers or data repositories, digital data storage, cloud storage, cloud computing servers, and/or the like).

Sensor Data|Sensors and Detectors

Preferably, S210 may function to collect or source sensor data from one or more sensors and/or detectors. In one or more embodiments, the one or more sensors and/or detectors may include, but are not limited to, sensors and/or detectors for humidity, temperature, pH, light, pressure, carbon diox-ide, moisture, air or wind speed, location, and/or any other sensor or detector (e.g., optical, audio, electrical, chemical, mechanical, and/or the like) suitable for use in an agricul-tural environment.

In some preferred embodiments, the one or more sensors and/or detectors may be arranged in the controlled cultivation environment. Additionally, or alternatively, in some embodiments, one or more of the sensors and/or detectors may be located outside of the controlled cultivation environment and may be arranged to externally monitor, sense, and/or detect conditions and properties of the controlled cultivation environment. In some embodiments, an arrangement of the one or more sensors and/or detectors may establish a complete field of view or sensing region for detecting a static and/or dynamic state of each crop located within the controlled cultivation environment. In some embodiments, a quantity and/or arrangement of the one or more sensors and/or detectors may be based on, or may determine, a quantity and/or arrangement of crops in the controlled cultivation environment.

Sensor Data|Sensor Suites

In one or more embodiments, the one or more sensors or detectors may include and/or be included in one or more sensor suites. A sensor suite, as referred to herein, may relate to a group or collection of one or more sensors or detectors in an integrated system or structure. In various embodiments, each sensor suite may include any combination of one or more types of sensors or detectors. Additionally, or alternatively, in one or more embodiments, each sensor suite may include one or more control and/or communication devices or modules including, but not limited to, microprocessors, one or more microcontrollers, one or more single-board computers, one or more local storage devices (e.g., flash memory, hard drives, solid-state drives, SD cards, RAM, and/or the like), one or more data ports (e.g. USB ports, HDMI ports, display ports, audio ports, camera ports, SD card slots, Ethernet ports, and/or the like), and/or one or more wireless communication modules (e.g., Bluetooth radios or modules, Wi-Fi radios or modules, and/or the like). In some embodiments, each sensor or detector in a sensor suite may be in operable communication with the one or more control or communication devices of the sensor suite.

Figure 3:
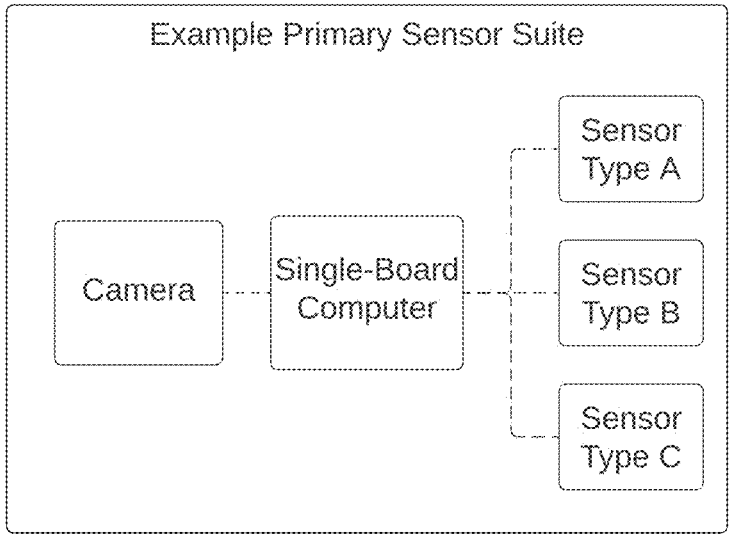
FIG. 3 illustrates a schematic representation of sensor suites in accordance with one or more embodiments of the present application.
Figure 3:
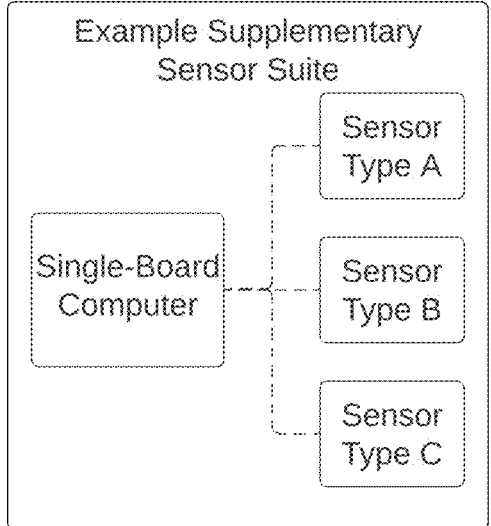

Some preferred embodiments may include one or more distinct or different types or categories of sensor suites, each of which may include a distinct set of sensors or detectors, as shown by way of example in FIG. 3. As a non-limiting example, one or more primary sensor suites may include a primary set of sensors and/or detectors, and one or more supplementary sensor suites may include a supplementary set of sensors and/or detectors distinct from the primary set of sensors and/or detectors. In some embodiments, one or more primary sensor suites may each include a camera and/or another image/video capturing device. In some embodiments, one or more supplementary sensor suites may be distinct from the one or more primary sensor suites in that the one or more supplementary sensor suites do not include a camera system and/or another image/video capturing device. In some such embodiments, the one or more supplementary sensor suites may include one or more non-image sensors. It shall be noted that the above examples and embodiments are not exclusive or limiting, and each category (e.g., primary, supplementary, or the like) of sensor suite may include any number or combination of sensors, detectors, and/or data capturing devices.

Figure 4:
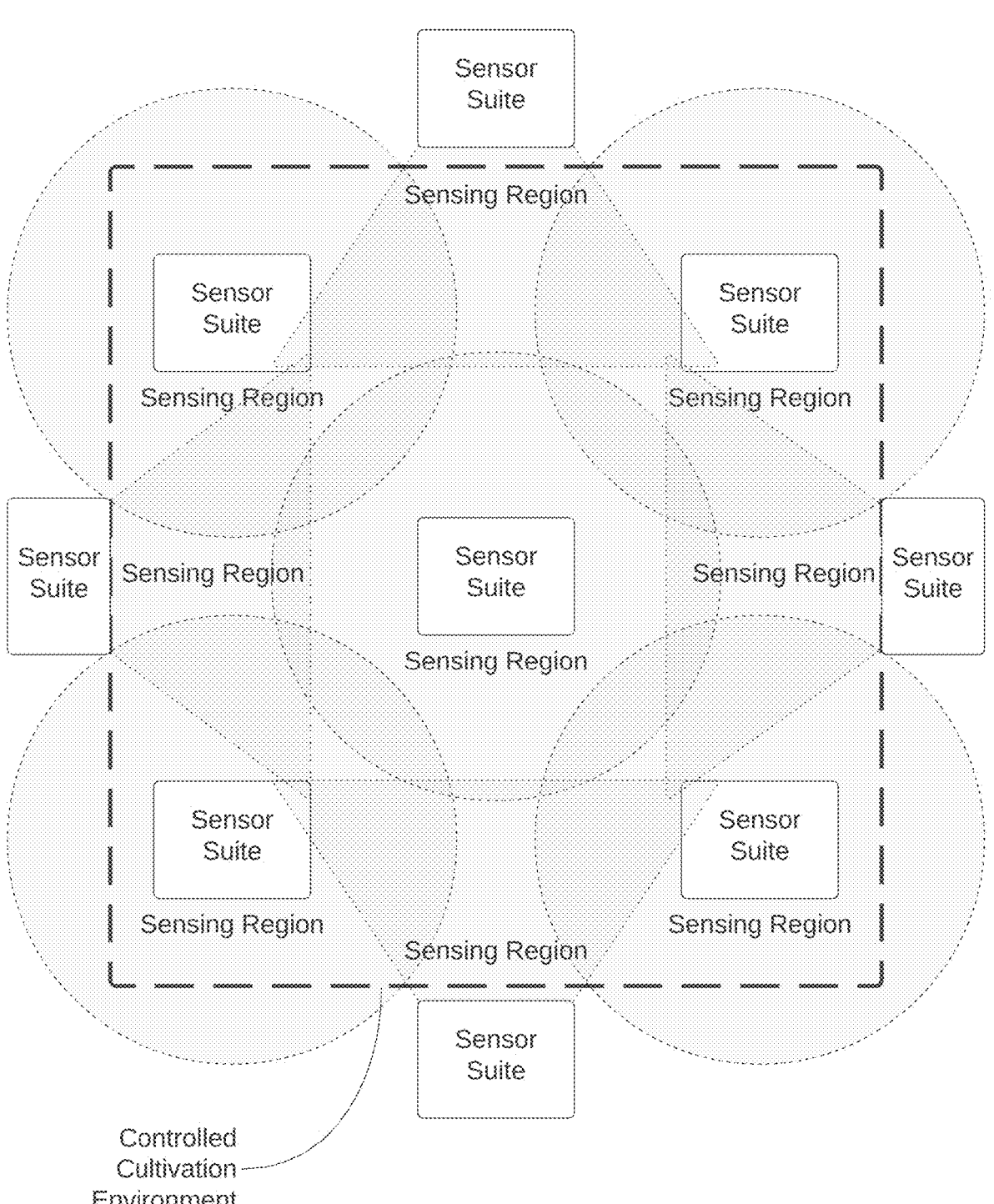
FIG. 4 illustrates a schematic representation of sensing regions in a controlled cultivation environment in accordance with one or more embodiments of the present application.

In some preferred embodiments, the one or more sensor suites may be arranged in the controlled cultivation environment. Additionally, or alternatively, in some embodiments, one or more of the sensor suites may be located outside of the controlled cultivation environment and may be arranged to externally monitor, sense, and/or detect conditions and properties of the controlled cultivation environment based on a sensing region of each sensor and/or sensor suite, as shown by way of example in FIG. 4. In some embodiments, sensing regions of one or more sensors or sensor suites may overlap. In some embodiments, an arrangement of the one or more sensor suites or sensors may establish a complete field of view or complete sensing region for detecting a static and/or dynamic state of each crop located within the controlled cultivation environment. In some embodiments, a quantity and/or arrangement of the one or more sensor suites may be based on, or may determine, a quantity and/or arrangement of crops in the controlled cultivation environment.

Sensor Data|Streaming and Storage

In one or more embodiments, the one or more sensors or detectors, and/or the one or more sensor suites, may be in communication with one or more local servers or other local storage devices (e.g., hard drives, user devices, and/or the like). In such embodiments, S210 may function to transmit and/or store the collected sensor data to/in the one or more local servers or other local storage devices. Additionally, or alternatively, in some embodiments S210 may function to transmit and/or store data in one or more remote storage locations or devices (e.g., remote servers, cloud servers, cloud computing devices, remote user devices, and/or the like). In such embodiments, S210 may function to transmit and/or store the collected sensor data to/in the one or more remote storage locations or devices.

2.2 Assessing the Sensor Data

S220, which includes assessing the collected sensor data, may function to collate, organize, and/or analyze the collected sensor data. In some preferred embodiments, S220 may function to manage one or more assessment workflows of the sensor data. An assessment workflow, as referred to herein, may relate to one or more assessment actions performed on the sensor data. Assessment actions, as referred to herein, may include routing sensor data (e.g., passing or transmitting sensor data from one component, module, or device to another), storing sensor data (e.g., on one or more local or cloud servers), validating sensor data, computing one or more sensor data metrics or values (e.g., computed values based on sensor data), generating metadata based on the collected sensor data, and/or any other suitable action for assessing sensor data. In various embodiments, routed sensor data, stored sensor data, computed sensor data metrics or values, generated metadata, and/or any other data or metadata generated or managed by S220 may sometimes be referred to herein as assessed sensor data.

Assessing Data|Data Validation and Feature Extraction

In some embodiments, S220 may function to assess the collected sensor data to identify and/or extract one or more distinct sensor data features from the collected sensor data. Extracted sensor data features may include one or more distinct elements, portions, and/or sets of collected sensor data that may be identified, selected, prioritized, isolated, and/or otherwise processed for further use or analysis. In some embodiments, S220 may additionally function to save, store, and/or route extracted sensor data features from the collected sensor data as assessed sensor data.

As a first non-limiting example, in embodiments in which the collected sensor data may include one or more images, S220 may function to implement image segmentation of one or more of the one or more images. In such an example, S220 may function to identify a particular section of an image or set of pixels of an image as an image segment, and S220 may further function to save, store, or route such an image segment as assessed sensor data. In such an example, the extracted sensor data features may include one or more image segments.

Additionally, or alternatively, in some embodiments, S220 may function to validate one or more data elements, portions, and/or sets of the collected sensor data. In such embodiments, S220 may function to identify and/or evaluate one or more sensor data validation indicia to determine whether any distinct element, portion, and/or set of the collected sensor data is valid. In some such embodiments, S220 may function to reject or dispose of collected sensor data that is determined to be invalid based on the one or more sensor data validation indicia. Sensor data validation indicia, as referred to herein, may include, but are not limited to, data types of the collected sensor data (e.g., numerical, text strings, and/or the like), data formats of the collected sensor data (e.g., a decimal numerical format, a distinct date format, etc.), data value ranges of the collected sensor data, and/or any other suitable indicia for identifying valid sensor data.

Assessing Data|Data Routing

In one or more embodiments, S220 may function to initiate and/or manage a routing of collected sensor data and/or assessed sensor data. In some embodiments, S220 may function to route collected sensor data and/or assessed sensor data based on one or more data routing criteria. Data routing criteria, as referred to herein, may include, but are not limited to, a data type of the collected and/or assessed sensor data, a data size of the collected or assessed sensor data, and/or any other suitable criteria for routing collected and/or assessed sensor data.

Assessing Data|Computing Metrics and Generating Metadata

In some embodiments, S220 may function to compute one or more sensor data metrics based on the collected sensor data. As referred to herein, a sensor data metric may relate to any value computed based on collected sensor data. In such embodiments, S220 may function to convert collected sensor data from an initial collected state (e.g., raw sensor data) to sensor data metrics that may improve user readability and/or facilitate further downstream processing of the data. As a non-limiting example, S220 may function to convert raw, unscaled, or unconverted values collected from one or more sensors (e.g., voltage, current, unscaled sensor values, etc.,) to sensor data metrics in engineering units or engineering values that may be suitable for output to a user or further processing. In such embodiments, S220 may function to compute the one or more sensor data metrics based on a sensor type (e.g., humidity sensor type, temperature sensor type, pH sensor type, light sensor type, pressure sensor type, carbon dioxide sensor type, moisture sensor type, location sensor type, and/or the like).

In some embodiments, S220 may function to generate metadata relating to the collected sensor data and/or the computed sensor data metrics. In such embodiments, S220 may additionally function to append the generated metadata to the associated collected sensor data or the associated computed sensor data metrics. In various embodiments, generated metadata may include, but is not limited to, a date/time value (e.g., timestamp or the like), an environment location value (e.g., GPS location, address, and/or the like), an environment identifying label (e.g., a name or ID for the target controlled cultivation environment), a sensor type label (e.g., humidity, temperature, pH, light, pressure, carbon dioxide, moisture, location, and/or the like), a sensor or sensor suite location value (e.g., GPS location, row and/or column values, address, or the like), a sensor or sensor suite identifying label (e.g., a name or ID for the sensor or sensor suite from which the collected sensor data may be sourced), a target crop label (e.g., a name or ID of a crop that may be associated with the collected sensor data), and/or any other suitable metadata relating to the collected sensor data.

In some embodiments, S220 may function to compute one or more sensor data metrics based on sensor metadata. As a non-limiting example, S220 may function to compute one or more sensor data metrics based on one or more sensor type labels associated with one or more elements of collected sensor data. In such a non-limiting example, S220 may function to convert raw, unsealed, or unconverted collected sensor data values to engineering units that may be based on a sensor type label (e.g., converting to temperature units based on a sensor type label of "temperature"). It shall be noted that the above example is non-limiting, and S220 may function to compute one or more sensor data metrics based on any category of sensor metadata.

In some embodiments, S220 may additionally or alternatively function to generate composite assessed sensor data (sometimes referred to herein as "composite data," "composite sensor data," or "composite environment data) by appending or collating one or more computed sensor data metrics, associated generated metadata, and/or associated collected sensor data. As a first non-limiting example, S220 may generate composite assessed sensor data by appending generated metadata (e.g., a timestamp) to an image or image data (sensor data) collected from an image sensor associated with the generated metadata (e.g., append a timestamp to an image captured at the timestamp). As a second non-limiting example, S220 may generate composite assessed sensor data by appending one or more computed metrics to an image or image data collected from an image sensor associated with the one or more appended computed metrics (e.g., appending a temperature metric from a temperature sensor to an image from an image sensor associated with the temperature sensor by location, sensor ID, and/or the like). It shall be noted that the preceding examples are non-limiting, and composite assessed sensor data may include any form, category, and/or combination of collected sensor data, computed sensor data metrics, generated metadata, and/or any other assessed sensor data. In some embodiments, S220 may function to identify associated sensor data metrics, generated metadata, and/or collected sensor data based on shared metadata (e.g., sensor data metrics and collected sensor data that may share a timestamp, location, environment ID label, sensor suite ID label, and/or any other metadata content).

2.3 Generating Crop Intelligence based on the Collected Sensor Data

S230, which includes generating crop intelligence based on the collected sensor data, may function to generate or construct crop intelligence data and/or crop intelligence rationales based on the collected sensor data. Crop intelligence data, as referred to herein, may include or relate to intelligence data computed or generated based on an analysis of the collected sensor data and/or the assessed sensor data. Crop intelligence rationales, as referred to herein, may relate to one or more identified or recommended actions based on an analysis of the collected sensor data, assessed sensor data, and/or generated crop intelligence data. In some embodiments, crop intelligence data and/or crop intelligence rationales may include, or be based on, one or more crop data benchmarks. Additionally, or alternatively, in some embodiments, generating crop intelligence data and/or crop intelligence rationales may be based on one or more predefined crop data reference packages. A crop data reference package, as referred to herein, may relate to one or more datasets that may relate to, or identify, a set of optimal environment characteristics and/or properties for a target crop.

Crop Intelligence|Crop Intelligence Data and Rationales

In one or more preferred embodiments, S230 may function to generate crop intelligence data and/or crop intelligence rationales based on the collected and/or assessed sensor data. Generating crop intelligence data and/or crop intelligence rationales may include evaluating and comparing collected or assessed sensor data to one or more crop reference benchmarks. A crop reference benchmark, as referred to herein, may relate to one or more predefined values, measures, ranges, or the like that may be used to evaluate collected or assessed sensor data for a distinct target crop. In some embodiments, S230 may function to identify target crops based on metadata (e.g., crop identification labels) associated with collected or assessed sensor data. In one or more embodiments, crop intelligence data may indicate whether collected and/or assessed sensor data values (e.g., sensor data metrics values) may be inside or outside of a target crop benchmark range. In various embodiments, each of the one or more crop reference benchmarks may be stored as a data table, a lookup table, a benchmark matrix, one or more benchmark values, a range of benchmark values, and/or any suitable data format or combination thereof for representing benchmark data. In some such embodiments, each crop reference benchmark may be associated with a distinct target crop and/or a distinct sensor type (e.g., pH sensor type, moisture sensor type, temperature sensor type, and/or the like). In such embodiments, S230 may function to identify one or more target crop benchmarks based on an identified target crop and/or an identified sensor type (e.g., based on a sensor type label or the like).

In some embodiments, S230 may function to generate crop intelligence data that may be descriptive of and/or identify one or more favorable and/or unfavorable environmental conditions or properties in the controlled cultivation environment. In such embodiments, S230 may function to identify the favorable and/or unfavorable environmental conditions or properties based on evaluating the one or more target crop benchmarks relative to collected or assessed sensor data associated with the target crop. In one or more such embodiments, S230 may function to generate crop intelligence data that may include, but is not limited to, one or more text labels or text summaries of the favorable and/or unfavorable environmental conditions or properties, collected and/or assessed sensor data associated with the target crop and/or the identified favorable and/or unfavorable environmental conditions or properties, one or more target crop benchmarks associated with the target crop and/or the identified favorable and/or unfavorable environmental conditions or properties, and/or any other data that may be descriptive of and/or identify one or more favorable and/or unfavorable environmental conditions or properties in the controlled cultivation environment.

As a non-limiting example, in embodiments in which the assessed sensor data may include temperature sensor data, a sensor type label (e.g., temperature sensor type label) and a target crop label, S230 may function to identify a target crop reference benchmark (e.g., a lookup table) for temperature based on the target crop identified by the target crop label and the sensor type (e.g., temperature) identified by the sensor type label. In turn, S230 may function to compare the assessed temperature sensor data to the target crop reference benchmark and may identify if the temperature sensor data is within a favorable or desirable range and/or if the temperature sensor data is within an unfavorable or undesirable range. In such an example, S230 may function to generate intelligence data that may indicate one or more results of such a comparison, e.g., if the temperature sensor data is within a favorable or desirable range and/or if the temperature sensor data is within an unfavorable or undesirable range. In such an example, the generated intelligence data may include a text label or summary that may be descriptive of the favorable or unfavorable status of the temperature in the controlled cultivation environment for the target crop, the associated temperature sensor data, the target crop reference benchmark for temperature, and/or any other suitable data associated with the favorable or unfavorable temperature status.

In some embodiments, S230 may additionally or alternatively function to generate one or more crop intelligence rationales (sometimes referred to herein as crop intelligence rationale artifacts) based on the collected sensor data, assessed sensor data, and/or generated crop intelligence. In such embodiments, crop intelligence rationales may include data or content that may be descriptive of or identify one or more recommended or corrective actions based on an analysis of the collected sensor data, assessed sensor data, and/or generated crop intelligence data. In one or more embodiments, crop intelligence rationales may include, but are not limited to, text labels, text summaries, text strings, icons, images, and/or the like that may be descriptive of or identify the one or more recommended actions for remediating one or more unfavorable environmental conditions or properties. As a non-limiting example, in an instance in which S230 may function to generate crop intelligence data that may identify an unfavorable temperature status (e.g., a too high or too low temperature for a target crop), S230 may further function to generate one or more crop intelligence rationales that may identify one or more recommended corrective actions based on the identified unfavorable temperature status (e.g., a recommendation to reduce temperature if the temperature is higher than favorable and/or a recommendation to increase the temperature). In such an example, the one or more generated crop intelligence rationales may include a text label, a text summary, and/or other descriptive content that may describe or indicate the recommended corrective action.

Crop Intelligence|Crop Data Reference Packages

In some embodiments, S230 may function to compare or evaluate assessed sensor data based on one or more crop data reference packages. In such embodiments, S230 may function to identify a distinct crop data reference package based on an identified target crop. In some embodiments, S230 may function to identify a target crop based on the collected or assessed sensor data and/or based on user input. In some embodiments, the assessed sensor data may include metadata relating to or identifying the target crop, such that S230 may function to identify the target crop based on the metadata of the assessed sensor data (e.g., crop ID labels or the like).

In some embodiments, each distinct crop reference data package may include one or more crop reference benchmarks. In such embodiments, S230 may function to generate intelligence data and/or one or more intelligence rationales based on the crop reference benchmarks included in the one or more crop reference data packages. Additionally, or alternatively, in some embodiments, S230 may function to construct one or more crop reference benchmarks based on the crop reference data in the one or more crop reference data packages. In such embodiments, the constructed crop reference benchmarks may be based on one or more datasets included in the one or more crop reference data packages that may relate to or identify optimal (i.e., favorable) environment characteristics and/or properties for cultivation of the target crop.

2.4 Identifying One or More Crop Anomalies Based on the Collected Sensor Data

S240, which includes identifying one or more crop anomalies based on the collected sensor data, may function to identify one or more crop anomalies for one or more target crops in the controlled cultivation environment. A crop anomaly (sometimes referred to herein as a crop anomalous condition or anomalous crop status), as referred to herein, may relate to any condition, status, agent, or combination thereof that may adversely affect the health and/or integrity of a target crop. In some embodiments, S240 may function to identify the target crop based on assessed sensor data (e.g., metadata including a crop ID or the like).

In various embodiments, S240 may function to identify and/or classify the one or more crop anomalies based on an analysis and/or evaluation of the collected sensor data. In some preferred embodiments, S240 may function to implement one or more crop anomaly identification machine-learning models for detecting, identifying, and/or classifying one or more crop anomalies. In some such embodiments, the one or more crop anomaly identification machine-learning models may function to classify one or more elements, sets, and/or streams of collected or assessed sensor data based on a particular identified crop anomaly.

Crop Anomalies

Preferably, S240 may function to identify one or more crop anomalies based on the collected sensor data. Additionally, or alternatively, in some embodiments, S240 may function to identify one or more crop anomalies based on the assessed sensor data and/or the generated crop intelligence data. In various embodiments, crop anomaly types or categories may include, but are not limited to, crop diseases, crop blights, crop blemishes, leaf spot diseases, fungal instances or infestations, pest instances or infestations, or any other condition, status, agent, or combination thereof that may affect the health and/or integrity of a crop.

Crop Anomaly Detection

In some embodiments, S240 may function to implement one or more crop anomaly identification machine learning models to identify the one or more crop anomalies. In such embodiments, the crop anomaly identification models may include models that may be trained using a corpus of labeled training samples to identify one or more crop anomalies or classifications of crop anomalies. Additionally, or alternatively, in some embodiments, the one or more crop anomaly identification models may include models trained using unlabeled training samples in an unsupervised learning process. In some embodiments, the one or more crop anomaly identification models may be an ensemble of crop anomaly identification models.

In some embodiments, S240 may function to construct an anomaly detection vector to be input to the crop anomaly identification models. In a first implementation, the anomaly detection vector may include image data from one or more images from the collected sensor data and/or from the assessed sensor data (e.g., images, image segments, and/or the like). In some such implementations, S240 may function to convert the image data into an n-dimensional vector format (e.g., converting image data in an image file format to an n-dimensional vector format). In some such implementations, the anomaly detection vector may be constructed exclusively based on image data.

Additionally, or alternatively, in a second implementation, the anomaly detection vector may include non-image data, such as sensor data metrics and/or sensor data values, from the collected sensor data and/or from the assessed sensor data. In some such implementations, S240 may function to convert the non-image data into an n-dimensional vector format (e.g., converting one or more values from non-image based sensors to a vector format). In some embodiments, the non-image data may function to augment an anomaly detection vector constructed from image data (e.g., the non-image data may be converted to an n-dimensional vector and appended or otherwise added to an anomaly detection vector constructed from image data). Alternatively, in some embodiments, the anomaly detection vector may be constructed entirely from non-image data.

Additionally, or alternatively, in a third implementation, the anomaly detection vector may include both image and non-image data from the collected sensor data and/or from the assessed sensor data. In some such implementations, S240 may function to convert both image and non-image data into an n-dimensional vector format (e.g., converting one or more values from non-image based sensors and one or more images from image based sensors to a vector format).

In one or more embodiments, S240 may function to input the anomaly detection vector into the one or more crop anomaly identification machine learning models. In some such embodiments, the one or more crop anomaly identification machine learning models may function to output one or more anomaly classifications based on the input anomaly detection vector. In such embodiments, the one or more anomaly classifications may each include an anomaly identification status that may indicate if an anomaly has been identified or not (e.g., anomalous or non-anomalous). Additionally, or alternatively, in some such embodiments, the one or more anomaly classifications may each include an anomaly type or anomaly type label that may indicate a category or type of identified anomaly (e.g., fungal anomaly, pest anomaly, blight anomaly, etc.), and/or an anomaly confidence value that may indicate a confidence or probability that an identified anomaly is accurately identified.

Additionally, or alternatively, in some embodiments, S240 may function to compute an anomaly severity level or anomaly severity value that may relate to or inform a degree of threat or risk an identified anomaly may pose to the target crop. In some such embodiments, the anomaly severity level or anomaly severity value may be a value in a range, such as a value between 0 and 100, 0 and 10, and/or the like. Alternatively, in some embodiments, the anomaly severity level or anomaly severity value may be a distinct discrete level or value of a set of distinct levels or values, such as a value of low, medium, or high. In various embodiments, the anomaly threat severity value may be based on an identified anomaly type (e.g., an identified anomaly type or category may pose a particular threat level to the target crop), a quantity or share of a target crop impacted by the anomaly (e.g., a percentage or quantity of a total target crop may be adversely affected by the identified anomaly), and/or any other suitable basis for establishing a severity of a crop anomaly.

2.5 Controlling One or More Environment-Regulating Devices

S250, which includes controlling one or more environment-regulating devices, may function to control one or more environment-regulating devices in the target cultivation environment based on the collected sensor data, the assessed sensor data, generated intelligence data, and/or the one or more identified anomalies. As used herein, an environment-regulating device (sometimes referred to herein as a remediation device) may refer to a device that may regulate or control one or more environmental conditions or properties in the target controlled cultivation environment. In one or more embodiments, S250 may function to automatically or semi-automatically control the one or more environment-regulating devices in the target environment. In some preferred embodiments, S250 may additionally and/or alternatively function to generate, output, and/or transmit one or more notifications based on the collected sensor data, the assessed sensor data, generated intelligence data, and/or the one or more identified anomalies to one or more users or subscribers.

Control|Environment-Regulating Devices

Preferably, S250 may function to control one or more environment-regulating devices in the target controlled cultivation environment based on the collected sensor data, the assessed sensor data, the generated intelligence data, and/or the identification of one or more anomalies. In various embodiments, environment-regulating devices may include, but are not limited to, lights or lighting devices (e.g., LED lights, grow lights, and/or the like), airflow generating devices (e.g., fans, blowers, and/or the like), irrigation devices (e.g., drip irrigation systems, sprinklers, automated irrigation systems, and/or the like), fertilizer delivery devices (e.g., automated fertilizer dispensers, spreaders, and/or the like), pesticide delivery devices (e.g., pesticide dispensers, spreaders, and/or the like), heating devices (e.g., electric heaters, warmers, and/or the like), cooling devices (e.g., air conditioning systems, thermoelectric coolers, evaporative coolers, and/or the like), and/or any other suitable device for regulating one or more environmental conditions or properties in the target controlled cultivation environment. In some preferred embodiments, S250 may function to initiate and/or execute an automatic environment-regulating workflow that controls the one or more environment-regulating devices in the target controlled cultivation environment based on generating and/or transmitting a control instruction set to the one or more environment-regulating devices.

Control|Generating and Transmitting a Control Instruction Set (Signal)

In some preferred embodiments, S250 may function to generate and/or transmit a control instruction set that may include one or more control signals and/or control instructions (sometimes referred to herein as regulating instructions) for the one or more environment-regulating devices. In some such embodiments, S250 may function to generate a control instruction set for the one or more environment-regulating devices based on one or more instances of generated crop intelligence, one or more of the one or more identified anomalies, one or more elements of assessed sensor data, and/or one or more instances of collected sensor data.

In one or more embodiments, S250 may function generate a control instruction set that may include one or more control signals and/or control instructions including, but not limited to, an activation or start control signal or control instruction that may activate or start one or more environment-regulating devices, a deactivation or stop control signal or control instruction that may deactivate or stop one or more environment-regulating devices, an incrementing control signal or control instruction that may increment or increase a degree or power of one or more environment-regulating devices, a decrementing control signal or control instruction that may decrement or decrease a degree or power of one or more environment-regulating devices, and/or any other suitable control signal or control instruction for an environment-regulating device.

In some embodiments, S250 may function to generate one or more timed control signals and/or control instructions, such that the one or more timed control signals and/or control instructions may be initiated at specific times (e.g., at a specific datetime, in a specific amount of time, and/or the like). In some embodiments, S250 may function to generate one or more duration control signals and/or control instructions, such that the one or more duration control signals and/or control instructions may be activated or active for a specific duration of time.

Preferably, S250 may function to transmit the control instruction set to one or more environment-regulating devices associated with the control signals and/or control instructions that may be included in the control instruction set. In various embodiments, S250 may function to transmit the control instruction set to the one or more environment-regulating devices by wireless communication (e.g., Wi-Fi, Bluetooth, cellular, radio, and/or other suitable wireless communication methods or protocols), wired communication (e.g., ethernet, power lines, and/or any other suitable wired communication method or protocol), and/or any other suitable communication method or protocol for transmitting control signals and/or control instructions.

Control Instruction Set|Remediation

In some embodiments, S250 may function to generate the control instruction set to remediate or counteract one or more unfavorable environmental conditions or properties. In some such embodiments, the one or more unfavorable environmental conditions or properties may be based on unfavorable environmental conditions or properties that may be identified or included in generated intelligence data (as described in 2.3). Additionally, or alternatively, S250 may function to generate the control instruction set based on one or more identified recommended or corrective actions that may be included or identified in generated intelligence rationales (as described in 2.3). As a non-limiting example, if generated intelligence data and/or one or more generated intelligence rationales indicate a high temperature for a target crop in the controlled cultivation environment, S250 may function to generate a control instruction set to activate or control one or more cooling devices in the controlled cultivation environment to remediate or counteract the unfavorable high temperature.

In some embodiments, S250 may function to generate the control instruction set to remediate, counteract, and/or neutralize one or more identified crop anomalies in the controlled cultivation environment. In such embodiments, S250 may function to identify one or more environment-regulating devices that may function to remediate, counteract, and/or neutralize the one or more identified crop anomalies based on the anomaly type or anomaly category of each identified crop anomaly, a location of the identified crop anomaly, and/or any other suitable data associated with the identified crop anomalies. As a non-limiting example, in an instance where an identified crop anomaly may be a pest-type crop anomaly, S250 may function to identify one or more environment-regulating devices in a location of the identified crop anomaly that may function to neutralize pest-type crop anomalies (e.g., one or more pesticide dispensers or pest repellents). In turn, in such an example, S250 may function to generate a control instruction set to activate or control the one or more identified environment-regulating devices to remediate, counteract, or neutralize the pest-type crop anomaly.

In some embodiments, S250 may function to identify a location of the one or more unfavorable environmental conditions, properties, and/or identified anomalies within the controlled cultivation environment based on location data (e.g., location sensor data, sensor identification metadata, location metadata, and/or the like). In such embodiments, S250 may function to generate a control instruction set to activate or control only a subset of the one or more environment-regulating devices identified to be local to or within an effective regulating range of the location of the one or more unfavorable environmental conditions, properties, and/or identified anomalies based on a location of each environment-regulating device.

Control|Subscriber Notifications

Figure 5:
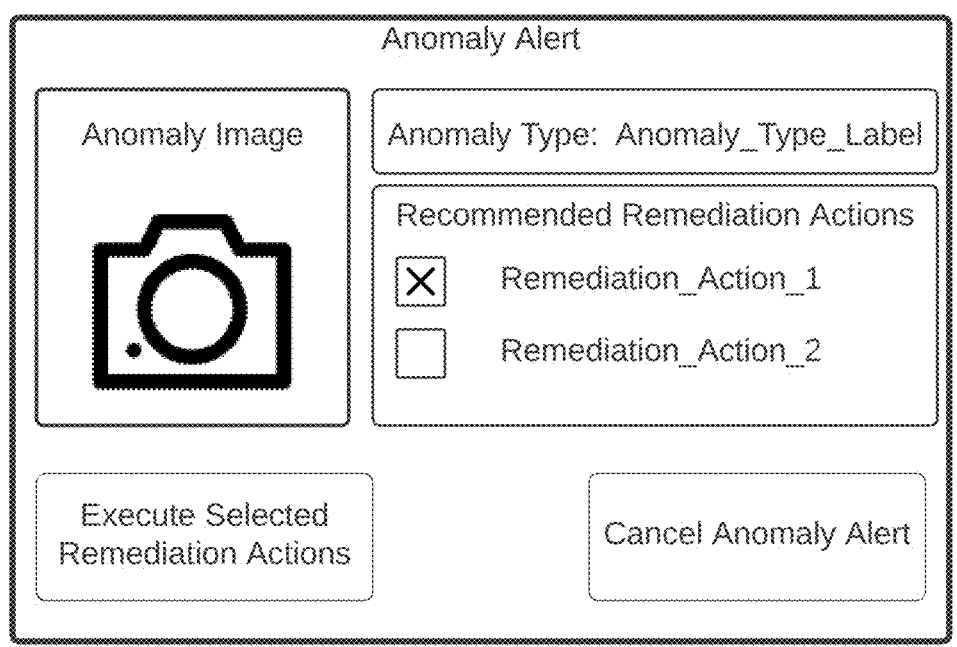
FIG. 5 illustrates examples of interactive notifications in accordance with one or more embodiments of the present application.
Figure 5:
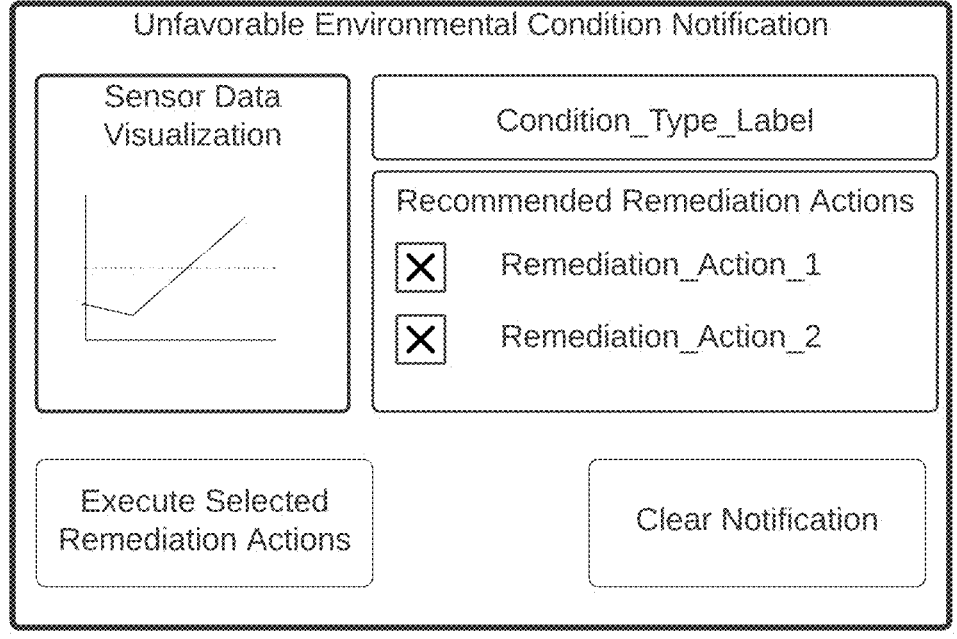

In some embodiments, S250 may function to construct one or more notifications (sometimes referred to herein as messages or alerts) to subscribers based on the collected sensor data, the assessed sensor data, the generated intelligence data, and/or the one or more identified anomalies to one or more users or subscribers, as shown by way of example in FIG. 5. In some embodiments, the one or more notifications or messages may be interactive or response-enabled, such that the one or more notifications or messages may receive input from the one or more users or subscribers. In some embodiments, S250 may additionally or alternatively function to construct one or more data visualization objects (e.g., graphs, charts, and/or the like) based on the collected sensor data, the assessed sensor data, the generated intelligence data, and/or the one or more identified anomalies that may be included in the one or more notifications.

In various embodiments, the one or more notifications may be delivered or transmitted to one or more subscribers via one or more communication channels or services including, but not limited to, email, SMS, one or more third-party messaging channels, a web-based interface, push notifications, and/or any other suitable communication channel or service for delivering one or more notifications. In various embodiments, S250 may additionally or alternatively function to receive responses or input from one or more interactive or response-enabled notifications via the one or more communication channels or services. In some embodiments, S250 may function to receive user or subscriber input from a response-enabled or interactive notification via a same communication channel or service used to deliver the response-enabled or interactive notification. Additionally, or alternatively, in some embodiments, S250 may function to receive user or subscriber input from a response-enabled or interactive notification via a communication channel or service different or distinct from a communication channel or service used to deliver the response-enabled or interactive notification.

Subscriber Notifications|Crop Intelligence and Anomaly Notifications

In some embodiments, the one or more notifications or messages may include one or more crop intelligence notifications (sometimes referred to herein as crop intelligence messages or crop intelligence alerts). As generally referred to herein, a crop intelligence notification may include crop intelligence-descriptive content (sometimes referred to herein as crop intelligence-communicating content) including, but not limited to, assessed sensor data associated with the generated crop intelligence (including sensor data metrics, segmented images or image data, generated metadata, composite data, and/or the like), collected sensor data associated with the generated crop intelligence (including sensor data values, sensor images or image data, and/or the like), crop intelligence data, one or more crop intelligence rationales, one or more crop data benchmarks, one or more textual summaries, labels, and/or text strings of crop intelligence data, one or more textual summaries, labels, and/or text strings of crop intelligence rationales, one or more textual summaries, labels, and/or text strings of crop data benchmarks, and/or any other data related to, associated with, or descriptive of generated crop intelligence data.

In some embodiments, S250 may function to construct one or more crop intelligence notifications based on, or in response to, the generating of crop intelligence data and/or the generating of one or more crop intelligence rationales.

In some embodiments, the one or more notifications or messages may include one or more crop anomaly notifications (sometimes referred to herein as crop anomaly messages or crop anomaly alerts). As generally referred to herein, a crop anomaly notification may include crop anomaly-descriptive content, assessed sensor data (including sensor data metrics, segmented images or image data, generated metadata, composite data, and/or the like), collected sensor data (including sensor data values, sensor images or image data, and/or the like), and/or crop intelligence data. In various embodiments, crop anomaly-descriptive content may include one or more textual summaries of one or more identified anomalies, one or more anomaly-descriptive labels that may identify a type, category, or classification of the one or more identified anomalies, one or more anomaly severity levels (e.g., anomaly severity level labels) or anomaly severity values, crop intelligence data and/or crop intelligence descriptive content related to the one or more identified anomalies, collected sensor data associated with the one or more identified anomalies (e.g., images, image data, sensor data values, and/or the like), and/or assessed sensor data associated with the one or more identified anomalies (e.g., sensor data metrics, segmented images or image data, generated metadata, and/or the like).

In some embodiments, S250 may function to construct one or more crop anomaly notifications based on, or in response to, the identifying of one or more crop anomalies.

In some embodiments, each crop anomaly notification may include one or more selectable interface objects that, when selected by a user or subscriber, indicate whether the one or more identified crop anomalies associated with the crop anomaly notification are user-verified or user-validated crop anomalies (e.g., whether the user or subscriber validates an identified crop anomaly). In such embodiments, each crop anomaly notification may include a distinct validating selectable interface object for validating or verifying each identified crop anomaly associated with the crop anomaly notification (i.e., at least one validating selectable interface object per each identified crop anomaly). Additionally, or alternatively, in such embodiments, each crop anomaly notification may include a distinct invalidating selectable interface object for invalidating or rejecting each identified crop anomaly associated with the crop anomaly notification (i.e., at least one invalidating selectable interface object per each identified crop anomaly).

Subscriber Notifications|User Response

In one or more embodiments, S250 may function to prompt or request a response from one or more users or subscribers via the one or more constructed notifications (which may include crop intelligence notifications and/or crop anomaly notifications). In some such embodiments, S250 may function to construct the one or more notifications as prompts or response-enabled notifications that may include one or more selectable interface objects (e.g., buttons, checkboxes, dropdown lists, radio buttons, and/or the like). In some embodiments, the one or more selectable interface objects may include one or more selectable interface objects that may relate to one or more corrective, neutralizing, or remediating actions that may be recommended based on one or more adverse or unfavorable environmental conditions or properties, one or more identified anomalies, and/or one or more user-validated identified anomalies. In some such embodiments, the recommended corrective or remediation actions may be based on recommended actions from one or more generated intelligence rationales. In some embodiments, the one or more selectable interface objects may enable a user or subscriber to indicate whether a distinct corrective or remediation action should be executed.

In some embodiments, each recommended corrective or remediation action may be associated with a distinct selectable interface object. Additionally, or alternatively, in one or more embodiments, the one or more selectable interface objects may enable a user to select a set of corrective or remediation actions. Additionally, or alternatively, in one or more embodiments, the one or more selectable interface objects may include a selectable interface object that may cancel one or more corrective or remediation actions that have been initiated. Additionally, or alternatively, in one or more embodiments, the one or more selectable interface objects in a constructed notification may include a selectable interface object that may dismiss, cancel, and/or reject the notification.

In some embodiments, S250 may function to generate and/or transmit the control instruction set based on a selection of one or more corrective or remediation actions by one or more users or subscribers (e.g., via the selectable interface objects). Accordingly, in such embodiments, S250 may function to permit a user or subscriber to modify and/or configure a generated control instruction set. In some embodiments, each distinct corrective or remediation action may relate to one or more environment-regulating devices or device types (e.g., a temperature corrective action may relate to one or more heating or cooling devices).

As a non-limiting example, S250 may function to generate a control instruction set including one or more instructions based on one or more remediation actions. In such an example, S250 may function to construct a notification requesting user input to confirm and/or modify the generated control instruction set. In such an example, a user may select and/or deselect one or more remediation actions, and S250 may in turn function to modify the generated control instruction set to include or exclude one or more instructions corresponding to the selected and/or deselected remediation actions.

Control|Automated Environment-Regulating Workflow

In one or more embodiments, S250 may function to execute an automated environment-regulating workflow to regulate one or more environmental conditions or properties by controlling one or more environment-regulating devices. In a first implementation, the one or more notifications generated by S250 may include one or more selectable interface objects that may function to enable a user or subscriber to initiate an automated environment-regulating workflow and/or indicate that an automated environment-regulating workflow may continue to be executed. In some embodiments, S250 may function to pause or suspend execution of the automated environment-regulating workflow, and S250 may in turn function to wait for user input or response that may indicate user confirmation to continue execution of the workflow or that may indicate a user-initiated cancellation of the workflow. In some embodiments, S250 may function to generate and/or transmit the control instruction set to the one or more environment-regulating devices based on the initiation of the automated environment-regulating workflow.

Alternatively, in a second implementation, S250 may function to automatically initiate and/or execute the automated environment-regulating workflow based on, or in response to, one or more regulating workflow automatic initiation conditions. In one or more embodiments, regulating workflow automatic initiation conditions may include, but are not limited to, the identification of one or more unfavorable environmental conditions or properties for a target crop (e.g., by generated intelligence data), a quantity of one or more unfavorable environmental conditions or properties, an identification of one or more corrective or remediation actions (e.g., by generated intelligence rationales), an identification of one or more anomalies, a quantity of identified anomalies exceeding a threshold, a category or type of one or more identified anomalies, a time elapsed while waiting for a user response exceeding a threshold (e.g., time elapsed waiting for a user to confirm execution of the workflow exceeding a threshold), and/or any other suitable condition for automatically initiating an automated environment-regulating workflow. In some such implementations, S250 may function to generate and/or transmit the control instruction set to the one or more environment-regulating devices based on the automatic initiation of the automated environment-regulating workflow. Additionally, in some such implementations, S250 may function to construct a response-enabled notification that may include one or more selectable objects that may enable a user or subscriber to cancel, stop, or override the automatically-initiated environment-regulating workflow.

Control|Cultivation Environment Dashboard

In some embodiments, S250 may function to implement a cultivation environment dashboard that may receive input from and/or provide output to one or more users (or subscribers). In some such embodiments, S250 may implement a graphical user interface (GUI) or the like that may be accessible to the one or more users or subscribers (e.g., via a web-based interface, an application on a computing device, an application on one or more user devices, and/or the like). In some embodiments, S250 may additionally or alternatively function to construct one or more data visualization objects (e.g., graphs, charts, and/or the like) based on the collected sensor data, the assessed sensor data, the generated intelligence data, and/or the one or more identified anomalies that may be included in the cultivation environment dashboard.

In some preferred embodiments, the cultivation environment dashboard may output dashboard data which may include, but is not limited to, collected sensor data, assessed sensor data, generated crop intelligence data, generated crop intelligence rationales, data describing one or more identified anomalies, and/or one or more constructed data visualization objects in real-time. In such embodiments, the cultivation environment dashboard may be continuously updated and/or refreshed based on collected, generated, and/or updated dashboard data, which may enable one or more users or subscribers to continuously monitor data via the cultivation environment dashboard. In some embodiments, the cultivation environment dashboard may include one or more selectable interface objects that may function to receive user input to select one or more elements of dashboard data to be displayed and/or to be hidden in the cultivation environment dashboard.

Additionally, or alternatively, in some embodiments, S250 may function to receive input or queries from one or more users or subscribers via a communication channel or service (e.g., email, SMS, one or more third-party messaging channels, and/or the like) to output or display, via the communication channel or service, one or more pieces or elements of user-requested data including, but not limited to, elements of collected sensor data, assessed sensor data, generated crop intelligence data, generated crop intelligence rationales, data describing one or more identified anomalies, and/or one or more constructed data visualization objects. Accordingly, in such embodiments, S250 may function to provide access to such elements of user-specified or user-requested data on-demand or as requested, via a communication channel or service utilized by the one or more users or subscribers.

In one or more embodiments, S250 may function to deliver one or more constructed notifications to one or more users or subscribers via the cultivation environment dashboard. Additionally, or alternatively, in some embodiments S250 may function to receive user or subscriber input from one or more response-enabled notifications via the cultivation environment dashboard.

In some embodiments, the cultivation environment dashboard may include one or more selectable interface objects that may enable the one or more users or subscribers to activate and/or deactivate one or more distinct environment-regulating devices. In one or more embodiments, the cultivation environment dashboard may enable the one or more users or subscribers to control individual environment-regulating devices and/or groups of environment-regulating devices. Additionally, or alternatively, in some embodiments, the cultivation environment dashboard may function to display or output a status (e.g., active, inactive, and/or the like) of the one or more environment-regulating devices.

3. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for automatically regulating a controlled agricultural environment, the method comprising:

sourcing, from one or more sensors arranged in a controlled agricultural environment, one or more sensor values associated with one or more environmental conditions of the controlled agricultural environment;

computing, by one or more computers, one or more sensor metrics based on the one or more sourced sensor values;

generating, by the one or more computers, crop intelligence data based on the one or more sensor metrics, wherein generating the crop intelligence data includes:

(i) identifying a target crop based on the sourced sensor values, and (ii) comparing the one or more sensor metrics to a target crop benchmark based on the identified target crop;

collecting one or more environment images from one or more image sensors;

generating environment image metadata content based on the one or more environment images;

automatically constructing one or more pieces of composite environment data based on the environment image metadata content and the one or more environment images;

automatically constructing, by the one or more computers, an interactive crop intelligence notification based on the generated crop intelligence data;

transmitting the interactive crop intelligence notification to a subscriber, wherein the interactive crop intelligence notification includes:

(i) one or more elements of crop intelligence-communicating content, wherein each element of crop intelligence-communicating content includes one or more characteristics of the generated crop intelligence data, and (ii) at least one selectable interface object that, when selected by the subscriber, initiates an automatic environment-regulating workflow that automatically controls one or more environment-regulating devices arranged within the controlled agricultural environment; and automatically controlling the one or more environment-regulating devices based on identifying a subscriber input associated with the at least one selectable interface object.

2. The method according to claim 1, further comprising:

collecting one or more environment images from one or more image sensors; and initiating a sensor data assessment workflow that, when executed, extracts one or more image segments from the one or more environment images;

wherein automatically constructing the interactive crop intelligence notification includes installing at least one of the one or more image segments as one of the one or more elements of crop intelligence-communicating content.

3. The method according to claim 1, further comprising:

collecting one or more environment images from one or more image sensors;

generating environment image metadata content based on the one or more environment images; and automatically constructing one or more pieces of composite environment data based on the environment image metadata content and the one or more environment images;

wherein the interactive crop intelligence notification includes the one or more pieces of composite environment data.

4. The method according to claim 1, further comprising:

generating, by the one or more computers, sensor metadata content based on the one or more sourced sensor values, wherein the sensor metadata content includes one or more distinct sensor type labels, each distinct sensor type label corresponding to a sensor type of one of the one or more sensors;

wherein at least one of the one or more sensor metrics is computed based on the one or more distinct sensor type labels; and wherein the one or more elements of crop intelligence-communicating content includes at least one of the one or more distinct sensor type labels.

5. The method according to claim 1, wherein:

generating the crop intelligence data includes:

identifying, based on comparing the one or more sensor metrics to the target crop benchmark, at least one of a favorable environmental condition of the controlled agricultural environment or an unfavorable environmental condition of the controlled agricultural environment;

wherein the one or more elements of crop intelligence-communicating content include content based on the identified at least one of the favorable environmental condition and the unfavorable environmental condition.

6. The method according to claim 1, wherein:

generating the crop intelligence data includes:

identifying, based on comparing the one or more sensor metrics to the target crop benchmark, at least one unfavorable environmental condition of the controlled agricultural environment; and identifying, based on the at least one unfavorable environmental condition, one or more remediation actions to remediate the at least one unfavorable environmental condition;

wherein the one or more elements of crop intelligence-communicating content include text-based content that includes one or more text strings that textually communicate the one or more remediation actions.

7. The method according to claim 6, wherein:

automatically controlling the one or more environment-regulating devices includes controlling the one or more environment-regulating devices based on the one or more remediation actions.

8. The method according to claim 1, further comprising:

identifying, by the one or more computers, one or more crop anomalies associated with one or more adverse effects in the controlled agricultural environment based on at least one of:

(a) one or more environment images collected from one or more image sensors, (b) the one or more sourced sensor values, or (c) the one or more sensor metrics; and transmitting a crop anomaly alert communication to the subscriber, wherein the crop anomaly alert communication includes text-based anomaly-descriptive content that includes one or more text strings that textually communicate one or more characteristics of the one or more crop anomalies.

9. The method according to claim 8, wherein:

identifying the one or more crop anomalies includes:

constructing an anomaly identification vector based on the one or more environment images;

implementing an anomaly identification machine learning model that:

(a) receives model input comprising the anomaly identification vector, and (b) predicts a corresponding anomaly classification for each of the one or more crop anomalies; and attributing a textual anomaly classification label to each of the one or more crop anomalies based on the corresponding anomaly classification of each of the one or more crop anomalies;

wherein the text-based anomaly-descriptive content includes at least one of the textual anomaly classification labels.

10. The method according to claim 8, wherein:

identifying the one or more crop anomalies includes:

constructing an anomaly identification vector based on the one or more sensor values;

implementing an anomaly identification machine learning model that:

(a) receives model input comprising the anomaly identification vector, and (b) predicts a corresponding anomaly classification for each of the one or more crop anomalies; and attributing a textual anomaly classification label to each of the one or more crop anomalies based on the corresponding anomaly classification of each of the one or more crop anomalies;

wherein the text-based anomaly-descriptive content includes at least one of the textual anomaly classification labels.

11. The method according to claim 8, wherein:

identifying the one or more crop anomalies includes:

identifying a corresponding anomaly category for each of the one or more crop anomalies; and computing an anomaly severity level associated with each of the one or more crop anomalies based on the corresponding anomaly category of each of the one or more crop anomalies;

wherein the crop anomaly alert communication includes an anomaly severity label corresponding to the associated anomaly severity level for each of the one or more crop anomalies.

12. The method according to claim 1, further comprising:

initiating a sensor data assessment workflow that, when executed, validates the one or more sensor values sourced from the one or more sensors based on one or more sensor data validation indicia;

wherein the one or more elements of crop intelligence-communicating content include the one or more validated sensor values.

13. The method according to claim 1, wherein:

sourcing the one or more sensor values includes sourcing the one or more sensor values from one or more primary sensor suites and one or more supplementary sensor suites distinct from the one or more primary sensor suites.

14. The method according to claim 13, further comprising:

collecting one or more environment images from one or more cameras of the one or more primary sensor suites;

wherein the interactive crop intelligence notification includes the one or more environment images.

15. A method for automatically counteracting an anomalous crop condition in a controlled cultivation environment, the method comprising:

identifying an anomalous crop condition based on sensor data associated with one or more target crops arranged in a controlled cultivation environment;

identifying a location of the anomalous crop condition within the controlled cultivation environment;

initiating an anomaly remediation workflow, wherein the anomaly remediation workflow includes:

(a) electronically transmitting a response-enabled notification to a user, wherein the response-enabled notification includes a request for user response to the response-enabled notification to confirm a continued execution of the anomaly remediation workflow, wherein electronically transmitting the response-enabled notification includes transmitting one or more images sourced from an image-based sensor arranged to capture images in the controlled cultivation environment, the one or more images depicting the anomalous crop condition;

(b) based on identifying the user response, generating a control instruction set based on the identified anomalous crop condition, wherein the control instruction set includes one or more instructions for controlling one or more remediation devices, wherein generating the control instruction set includes identifying the one or more remediation devices as one or more local remediation devices based on the location of the anomalous crop condition; and (c) transmitting one or more control signals to the one or more remediation devices based on the control instruction set;

wherein the one or more remediation devices are activated based on transmitting the one or more control signals.

16. The method according to claim 15, further comprising:

identifying a location of the anomalous crop condition within the controlled cultivation environment;

wherein generating the control instruction set includes identifying the one or more remediation devices as one or more local remediation devices based on the location of the anomalous crop condition and locations of the one or more local remediation devices; and wherein transmitting the one or more control signals includes transmitting the one or more control signals to the one or more local remediation devices.

17. The method according to claim 15, wherein:

the sensor data comprises one or more images sourced from an image-based sensor arranged to capture images in the controlled cultivation environment;

identifying the anomalous crop condition includes identifying the anomalous crop condition based on at least one of the one or more images; and electronically transmitting the response-enabled notification includes transmitting the at least one of the one or more images, wherein the response-enabled notification includes the at least one of the one or more images.

18. A method for regulating a controlled agricultural environment, the method comprising:

collecting, via one or more computers, sensor data from one or more sensors wherein each of the one or more sensors has a sensing region at least partially within a controlled agricultural environment;

identifying, based on comparing one or more pieces of the sensor data to a crop benchmark, at least one unfavorable environmental condition of the controlled agricultural environment; and constructing, via the one or more computers, a set of one or more automated environment-regulating instructions based on identifying the at least one unfavorable environmental condition;

identifying, via the one or more computers, a localized subset of environment-regulating devices based on:

(a) a location of the at least one unfavorable environmental condition, and (b) a device location of each environment-regulating device of the localized subset;

identifying each of the one or more corresponding environment-regulating devices by selecting the devices from the localized subset;

electronically transmitting the set of one or more automated environment-regulating instructions to one or more corresponding environment-regulating devices, wherein each of the one or more corresponding environment-regulating devices is activated based on receiving at least one automated environment-regulating instruction of the set of one or more automated environment-regulating instructions; and automatically constructing and transmitting an interactive alert notification to a subscriber, the interactive alert notification including a request for subscriber input for confirming one or more regulating actions based on the at least one unfavorable environmental condition, wherein transmitting the set of automated environment-regulating instructions is based on receiving the subscriber input.

\* \* \* \* \*